(12) United States Patent  (10) Patent No.: US 8,467,082 B1
Miller et al.  (45) Date of Patent: Jun. 18, 2013

(54) PRINT COMPOUND CONSERVING FONT PRODUCTION METHOD

(76) Inventors: Jonathan Miller, Ashville, PA (US); Mariemma Miller, Ashville, PA (US)

( * ) Notice: Subject to any disclaimer, the term of this patent is extended or adjusted under 35 U.S.C. 154(b) by 338 days.

(21) Appl. No.: 13/069,799

(22) Filed: Mar. 23, 2011

Related U.S. Application Data

(60) Provisional application No. 61/316,489, filed on Mar. 23, 2010.

(51) Int. Cl.
*G06F 15/00* (2006.01)
*G06F 3/12* (2006.01)
*G06K 1/00* (2006.01)
*G06K 15/02* (2006.01)

(52) U.S. Cl.
USPC ........................................ 358/1.15; 358/1.11

(58) Field of Classification Search
None
See application file for complete search history.

(56) References Cited

U.S. PATENT DOCUMENTS

| | | | |
|---|---|---|---|
| 10,292 | A | 11/1877 | Herriet |
| 5,583,621 | A | 12/1996 | Narukawa |
| 5,684,933 | A | 11/1997 | Nagafusa |
| 5,699,172 | A | 12/1997 | Hattori et al. |
| 5,729,270 | A | 3/1998 | Wright et al. |
| 6,609,776 | B2 | 8/2003 | Ames et al. |
| 6,829,064 | B1 | 12/2004 | Yu et al. |
| 6,975,428 | B1 | 12/2005 | Ernst et al. |
| 7,773,089 | B2 * | 8/2010 | Nakamura et al. ............ 345/467 |
| 2002/0135800 | A1 | 9/2002 | Dutta |
| 2004/0095587 | A1 | 5/2004 | Brown et al. |
| 2005/0063749 | A1 | 3/2005 | Harris et al. |
| 2010/0142002 | A1 * | 6/2010 | Imai ............................... 358/2.1 |

OTHER PUBLICATIONS

ECOFONT.COM Website—How It Works, http://www.ecofont.com/en/products/green/printing/environmentally- aware-printing-with-ecofont.html. Downloaded on Nov. 15, 2010.
Close-Up of Ecofont Logo, http://en.wikipedia.org/wiki/File:Ecofont_Logo.jpg. Downloaded on Nov. 15, 2010.
National Public Radio Transcript: Changing Font to Save Ink, http://www.npr.org/templates/story/story.php?storyId=125639616. Downloaded on Nov. 18, 2010.
Inksaver 2.0 Website—Product Info, http://inksaver.com/overview/index.html. Downloaded on Dec. 8, 2010.

* cited by examiner

*Primary Examiner* — Douglas Tran

(57) ABSTRACT

Processes and systems for creating and/or modifying font glyphs comprising the addition of variably-sized negative space perforations in various shapes placed among the glyph body black space and within the glyph body outline. Within each negative space perforation may be placed nested positive space perforations of variable size and shape. A user of font glyphs generated in accordance with the invention can employ the font glyphs for on-screen digital viewing and/or for hardcopy prints. By using variable-sized perforations and variable-sized nested perforations, font glyphs are generated that consume less printing compound when generating hardcopy text. Font glyphs generated in accordance with the invention are more efficient to use when printing hardcopies due to intelligently arranged negative/positive space that utilizes print compound bleeding, when available, and display only the most distinct sections of each font glyph, assisting in maintaining sufficient text legibility.

20 Claims, 15 Drawing Sheets

| Character | # of pixels removed | # of pixels in blackspace | # of pixels total | % removed via our process |
|---|---|---|---|---|
| a | 43116 | 58840 | 101956 | 42.29% |
| b | 15620 | 27341 | 42961 | 36.36% |
| c | 20426 | 38085 | 58511 | 34.91% |
| d | 14368 | 31765 | 46133 | 31.14% |
| e | 23591 | 44348 | 67939 | 34.72% |
| f | 27386 | 65762 | 93148 | 29.40% |
| g | 38495 | 103092 | 141587 | 27.19% |
| h | 43880 | 25140 | 69020 | 63.58% |
| i | 22298 | 45735 | 68033 | 32.78% |
| j | 28824 | 60010 | 88834 | 32.45% |
| k | 44570 | 22543 | 67113 | 66.41% |
| l | 24720 | 55690 | 80410 | 30.74% |
| m | 50879 | 32060 | 82939 | 61.35% |
| n | 38834 | 76146 | 114980 | 33.77% |
| o | 27913 | 70699 | 98612 | 28.31% |
| p | 41330 | 97351 | 138681 | 29.80% |
| q | 40330 | 94311 | 134641 | 29.95% |
| r | 27107 | 45385 | 72492 | 37.39% |
| s | 25250 | 58243 | 83493 | 30.24% |
| t | 23979 | 52507 | 76486 | 31.35% |
| u | 40094 | 69010 | 109104 | 36.75% |
| v | 23600 | 49963 | 73563 | 32.08% |
| w | 41854 | 83221 | 125075 | 33.46% |
| x | 30801 | 59571 | 90372 | 34.08% |
| y | 28432 | 64410 | 92842 | 30.62% |
| z | 29076 | 55212 | 84288 | 34.50% |

FIG. 1

| Character | # of pixels removed | # of pixels in blackspace | # of pixels total | % removed via our process |
|---|---|---|---|---|
| A | 10047 | 23830 | 33877 | 29.66% |
| B | 55542 | 122217 | 177759 | 31.25% |
| C | 37600 | 22873 | 60473 | 62.18% |
| D | 26762 | 42903 | 69665 | 38.42% |
| E | 46089 | 28310 | 74399 | 61.95% |
| F | 44963 | 89138 | 134101 | 33.53% |
| G | 11190 | 28838 | 40028 | 27.96% |
| H | 19295 | 30642 | 49937 | 38.64% |
| I | 31538 | 60487 | 92025 | 34.27% |
| J | 35760 | 71338 | 107098 | 33.39% |
| K | 16659 | 27768 | 44427 | 37.50% |
| L | 41615 | 72394 | 114009 | 36.50% |
| M | 18023 | 41206 | 59229 | 30.43% |
| N | 11679 | 32174 | 43853 | 26.63% |
| O | 9829 | 31855 | 41684 | 23.58% |
| P | 45003 | 96792 | 141795 | 31.74% |
| Q | 11774 | 36934 | 48708 | 24.17% |
| R | 15688 | 31106 | 46794 | 33.53% |
| S | 41057 | 101274 | 142331 | 28.85% |
| T | 42954 | 21181 | 64135 | 66.97% |
| U | 10010 | 26398 | 36408 | 27.49% |
| V | 10860 | 20277 | 31137 | 34.88% |
| W | 18901 | 34837 | 53738 | 35.17% |
| X | 13853 | 27127 | 40980 | 33.80% |
| Y | 11326 | 21059 | 32385 | 34.97% |
| Z | 56644 | 22031 | 78675 | 72.00% |
| 0 | 43977 | 71147 | 115124 | 38.20% |
| 1 | 25991 | 41241 | 67232 | 38.66% |
| 2 | 41468 | 65143 | 106611 | 38.90% |
| 3 | 41207 | 80679 | 121886 | 33.81% |
| 4 | 40309 | 75466 | 115775 | 34.82% |
| 5 | 40577 | 79466 | 120043 | 33.80% |
| 6 | 45515 | 83895 | 129410 | 35.17% |
| 7 | 24361 | 55762 | 80123 | 30.40% |
| 8 | 56651 | 98461 | 155112 | 36.52% |
| 9 | 39993 | 88439 | 128432 | 31.14% |
| . (period) | 6388 | 7884 | 14272 | 44.76% |

Average percent of prototype font's body removed with the embodiment (also, the average savings of ink/toner per printed character): 36.49%

FIG. 2

| Character | # pixels printed | # pixels removed | # pixels total | % removed |
|-----------|------------------|------------------|----------------|-----------|
| D | 42,903 | 26,762 | 69,665 | 38.414 |

PRINT COMPOUND CONSERVING FONT PRODUCTION METHOD

CROSS-REFERENCE TO RELATED APPLICATIONS

This application claims benefit under 35 U.S.C. §119(e) to provisional. U.S. patent application No. 61/316,489, filed Mar. 23, 2010. The entire contents of the aforementioned provisional application are incorporated herein by reference.

BACKGROUND

The presently disclosed subject matter relates to computer fonts and how they are used to produce hardcopy documents via a printer. Fonts are an important part of desktop publishing. When composing a written document in Microsoft Office Word™, Apple iWork Pages™, OpenOffice Writer™, or most any other publishing tool, multiple fonts are available to the user to describe how his/her words should appear on the screen and on paper. Each time a document is printed to make a hardcopy, the inkjet, laser, or other printer technology consumes ink, toner, or some other sort of print compound. Print compound such as black ink costs several cents per page of text.

When working with the characters, numbers, and symbols (hereinafter "glyphs"), collections of glyphs of similar style (hereinafter a "font"), and collections of related fonts (hereinafter a "family"), it is important to understand an element of visual design. With typography, as in other visual disciplines, there is interplay between positive and negative space. Positive space is where an image's main point of interest is, whereas negative space is all that is not a primary element. For typography in general, and font glyphs specifically, a character is commonly represented as a black symbol on a white background. The black elements are the positive space whereas the white areas are the negative space. Typically negative space is larger than positive space for a given work. The following references relate to positive and negative space in printing:

U.S. Pat. No. 6,609,776 B2 for INKJET PRINTING SYSTEM WITH INK-EFFICIENT FONT to Ames, et al. (hereinafter "Ames") provides a high throughput printing system that can use a hybrid ink-efficient font. Intended for producing point-of-sale ("POS") receipts, the system described produces alphanumeric characters "defined by a single sequence of marking dots." By nature of POS receipts and their short-lived use, an additive approach to making an efficient font is disclosed. That is, Ames discloses printing only the minimum number of ink dots necessary to generate a minimally legible receipt.

U.S. Pat. No. 5,699,172 for IMAGE FORMING APPARATUS AND METHOD HAVING A TONER AND INK SAVING FEATURE to Hattori et al (hereinafter "Hattori") discloses an ink, saving feature that is built into a printer processor. The feature is content agnostic in that it will attempt to make bitmap image data, sent from an external device to a printing device, conserve ink by reforming the bitmap image data in such a way as to retain parts of the image that are most distinct while decreasing ink output to areas of the image that are determined, by machine, to be less distinct. However, by indiscriminately reforming bitmap data based on a machine's interpretation of what areas of the bitmap data are to be conserved, the user of the system is left without control as to which particular elements of the printed document should be left unaffected and which should use an ink saving feature.

InkSaver 2.0™ (http://www.inksaver.com) is a product by Software Imaging, of the United Kingdom, that does not redesign fonts but instead makes all printed materials, such as fonts but also including images, diagrams, and other non-text objects, in lighter shades of gray to conserve black ink/toner. By indiscriminately making fonts less black and more gray, InkSaver 2.0™ decreases a document's readability.

One product that seeks to conserve print compound by focusing solely on an efficient computer font is Ecofont™ (http://www.ecofont.com), by SPRANQ, of the Netherlands. Ecofont™ contains a series of similarly-sized circles and claims approximately 20% ink/toner conservation compared to a font that does not contain the circles.

SUMMARY OF THE INVENTION

A goal of the presently disclosed subject matter is to put forth a method for integrating variably-sized, variably-shaped arrangements of positive and negative spaces into a glyph's body so as to sufficiently preserve the overall integrity and legibility of the glyph, but to simultaneously conserve the amount of printing compound needed to apply the glyph to print media with a printing device. Depending on the printing compound and print media, bleeding effects, such as slight running that may arise when applying ink to common office paper, may occur within a glyph's body and help to bolster glyph legibility given, the unique positive and negative space arrangements disclosed in accordance with the invention. Unlike the additive approach used in POS receipts, as disclosed in Ames, the present inventors have discovered that a subtractive approach is better-suited for printing in a broader context. A font, originally designed to meet a high degree of legibility, is perforated with negative space as much as reasonable so as to only slightly degrade the font's legibility while conserving a significant amount (i.e., 30% or more) of ink.

Ecofont™, discussed above, is less efficient in its use of printing compound compared to prototypes developed using the embodiment (see FIG. 1 and FIG. 2 for supporting data).

Embodiments according to the present invention contain nested perforations to promote bleeding. This bolsters legibility and takes advantage of a glyph's smaller contours through variably-sized and variably-shaped perforations. No process formerly developed provides print compound-conserving benefits without hindering document legibility or without conserving a comparable amount of print compound. Additionally, no product or process exists that utilizes print compound bleeding effects and variably-sized, variably-shaped perforations, with or without nested perforations of similar description.

The presently disclosed subject matter works in connection with modifying an existing font's design and/or designing a new font. In accordance with an embodiment of the invention, a series of various-sized negative space perforations are contained within a font glyph's body outline and set among the "black" or "positive" space of each typographical character of a font. The perforations may also contain a small individual or cluster of nested perforations. The perforations and nested perforations may be of any two-dimensional shape such as hearts, triangles, peace symbols, and so on. The arrangement of the shapes is made by a font designer/modifier using font-editing software, or procedurally via a computer algorithm. The arrangement of shapes is incorporated into a collection of font glyphs and saved for future use. In other embodiments, the arrangement is to be applied to a non-perforated collection of glyphs automatically, immediately prior to printing to hardcopy.

Several advantages of the presently disclosed subject matter are to provide print compound-conserving fonts, to provide a means for users to select unique two-dimensional shapes with which their font(s) is composed, to utilize naturally-occurring print compound 'bleeding effects' as a means for improving font legibility, and to allow users to save on print compound costs. Still further advantages will become apparent from a study of the following description and the accompanying drawings.

BRIEF DESCRIPTION OF THE DRAWINGS

FIG. 1 is a chart showing glyph pixel counts and the resulting print compound conservation percent for 26 lower case characters of the font "Georgia" after modification in accordance with the present invention.

FIG. 2 is a chart showing glyph pixel counts and the resulting print compound conservation percent for 26 upper case characters, 10 numerals, one special character, and the average print compound savings per character of the font "Georgia" after modification in accordance with the present invention.

DETAILED DESCRIPTION WITH REFERENCE TO THE DRAWINGS

FIG. 1 shows glyph pixel counts and the resulting print compound conservation percent for 26 lower case characters of the font Georgia after modification in accordance with an embodiment of the present invention. The methodology for acquiring the pixel counts is discussed with reference to FIG. 6.

FIG. 2 shows glyph pixel counts and the resulting print compound conservation percent for 26 upper case characters, 10 numerals, one special character, and the average print compound savings per character of the font "Georgia" after modification in accordance with an embodiment of the present invention. The methodology for acquiring the pixel counts is discussed with reference to FIG. 6. The font after modification, according to the present invention, consumes 36.49% less printing compound compared to the font prior to modification.

Figure 3:
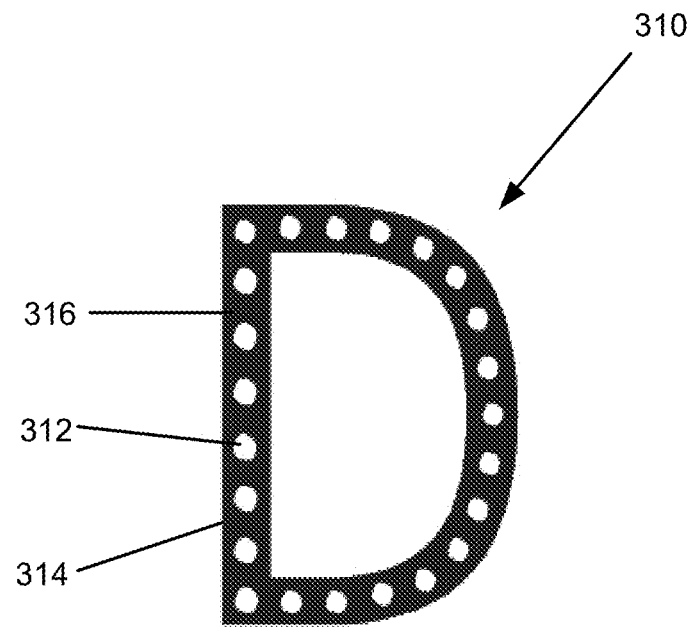
FIG. 3 (PRIOR ART) is a view of a sample font glyph of Ecofont™.

FIG. 3 shows a sample font, glyph 310 from Ecofont™, a prior art reference discussed in the Background section. The font is at least 10% less efficient in its use of printing compound compared to fonts generated in accordance with the present invention. See FIG. 1 and FIG. 2 for supporting data. The circular perforations 312 contained within the glyph's outline 314, in the black space 316 of the glyph 310, are similarly sized and contain no nested perforations to promote bleeding. The lack of nested perforations decreases the overall legibility of the glyphs in the font. Given the single size of all the perforations, this design cannot take advantage of a glyph's smaller contours, unlike the variably-sized, variably-shaped perforations and nested perforations generated in accordance with the present invention, as shown with reference to FIG. 4.

Figure 4:
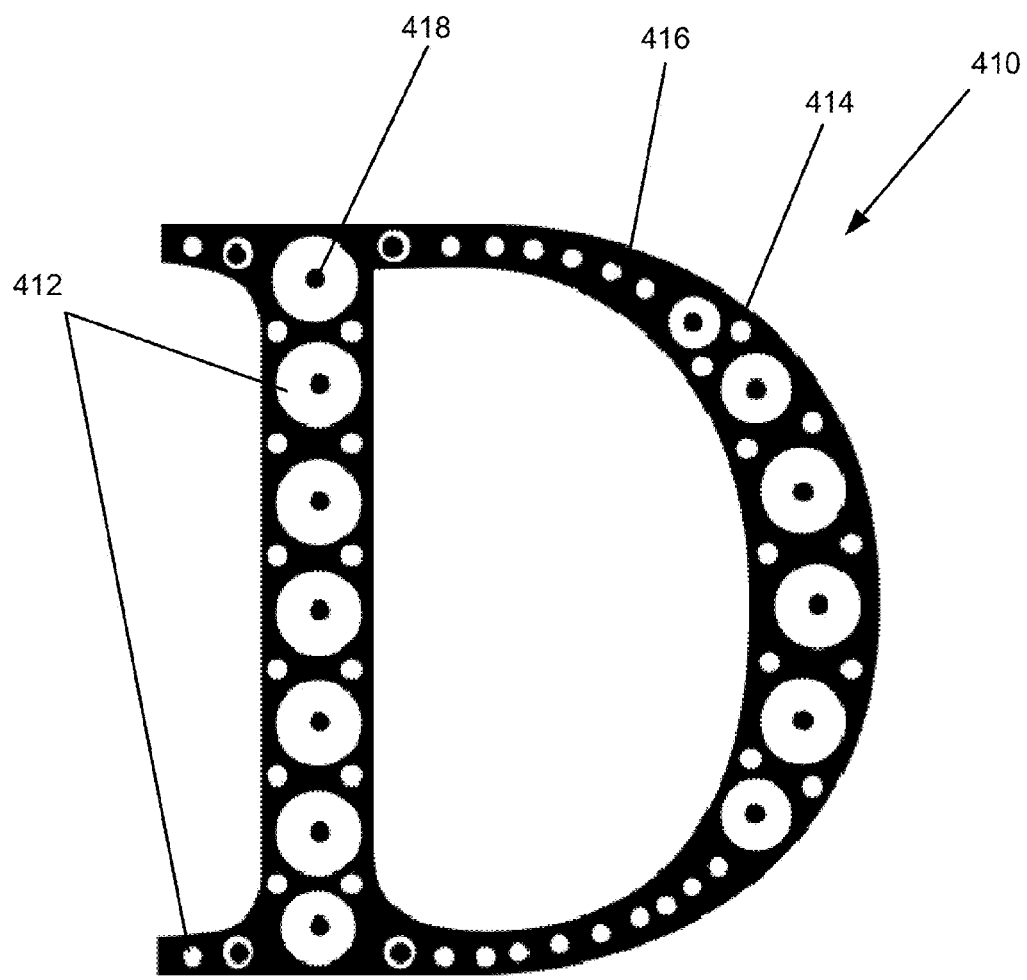
FIG. 4 is a view of a sample font glyph that was generated in accordance with the present invention, showing various-sized circular negative space perforations with and without nested circular perforations.

FIG. 4 is a view of a sample font glyph 410 that was generated in accordance with the present invention. The figure shows various-sized negative space perforations 412 that are contained within the glyph body outline 414 and set among a black space 416. As can be seen, many of the perforations 412 contain nested perforations 418.

Fonts generated in accordance with the present invention conserve print compound and maximize printed font legibility in at least the following ways:

(1) Negative space perforations, 412, instruct a printing device to withhold printing compound at their locations, decreasing the total amount of printing compound needed to print a glyph 410.

2) Nested perforations such as 418 instruct a printing device to apply printing compound at their locations, minutely increasing the amount of printing compound needed to print a glyph 410 but also bolstering glyph legibility.

(3) Print compound bleeding can occur at the interface of negative space perforations 412, nested perforations such as 418, glyph body black space 416, and a glyph body's outline 414. The use of nested perforations, 418, allows bleeding to enhance the boldness of the negative space caused by perforations such as 412, thereby enhancing glyph legibility.

Figure 5:
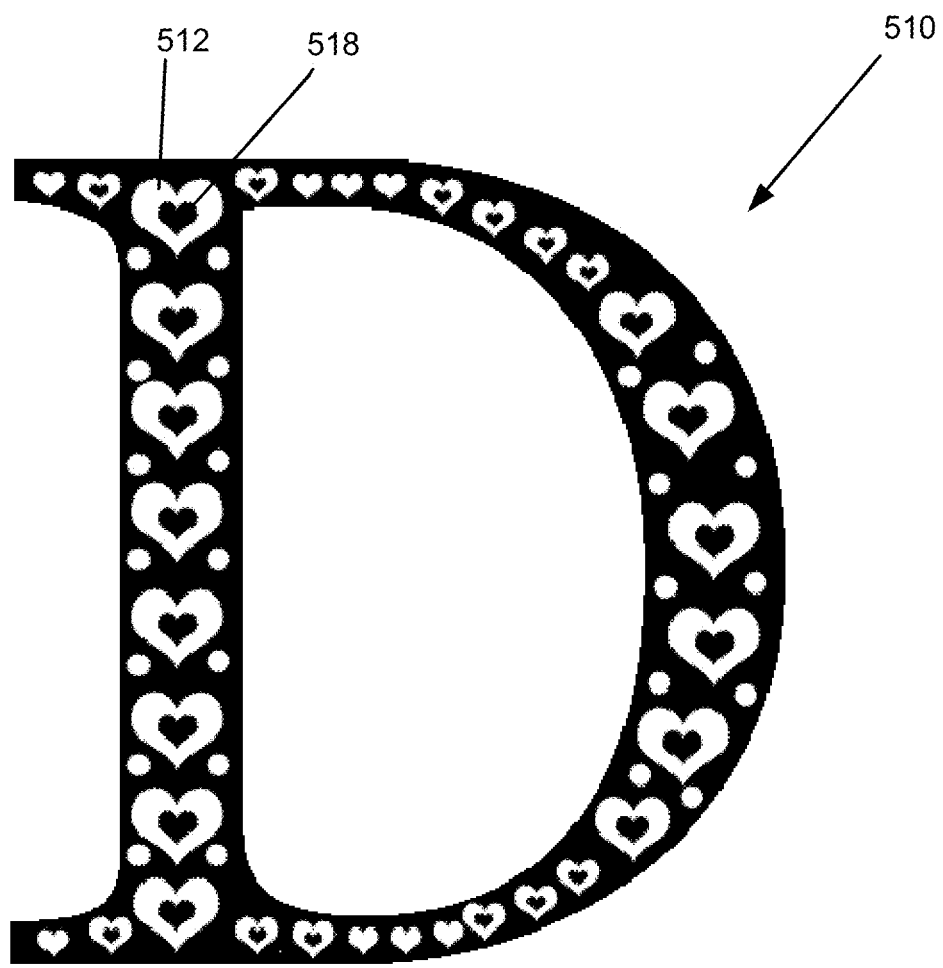
FIG. 5 is a view of a sample font glyph that was constructed in accordance with the present invention. This figure is similar to FIG. 4, but highlights the use of an alternative shape for perforations. The glyph contains heart-shaped perforations with and without nested heart-shaped perforations.

FIG. 5 is a view of a sample font glyph 510 that was generated in accordance with the present invention. This figure is similar to FIG. 4, except it highlights the use of an alternative shape for negative space perforations 512. The glyph shown in this figure contains negative space heart-shaped perforations 512 with and without nested heart-shaped perforations 518.

Figure 6:
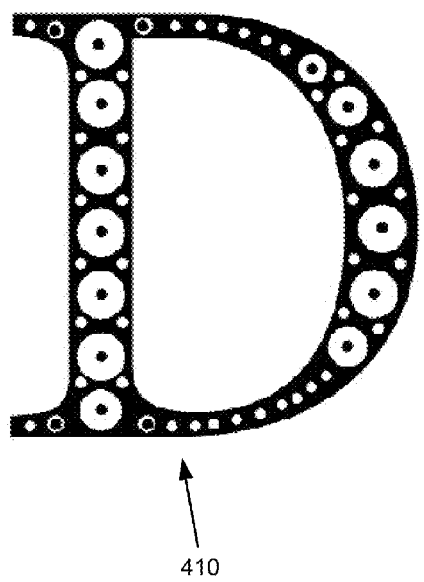
FIG. 6 is a direct comparison view of a rendering of a sample font glyph, similar to that in FIG. 4, and a magnified view of its ink-based analogue, printed on paper. The chart shows how a glyph's print compound-conservation percentage is calculated.
Figure 6:
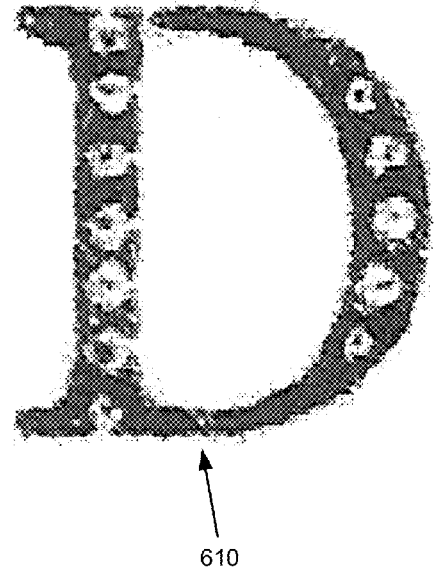

FIG. 6 is a direct comparison view of a rendering of sample font glyph 410 from FIG. 4, and a magnified view of its ink-based analogue 610, printed on paper. The chart 624 shows how a glyph's print compound-conservation percentage is calculated, by measuring the area of white space caused by the perforations compared to the total area contained by the glyph's outline, The column "# pixels printed" refers to the number of black pixels composing glyph 410, whereas the column "# pixels removed" refers to the number of white pixels contained within the general outline of glyph 410. By dividing "# pixels removed" by the sum of "# pixels printed" and "# pixels removed" and converting to a percentage, the "% removed" column is completed. The glyph uses 38.414% less print compound compared to a font not generated in accordance with an embodiment of the present invention.

Figure 7:
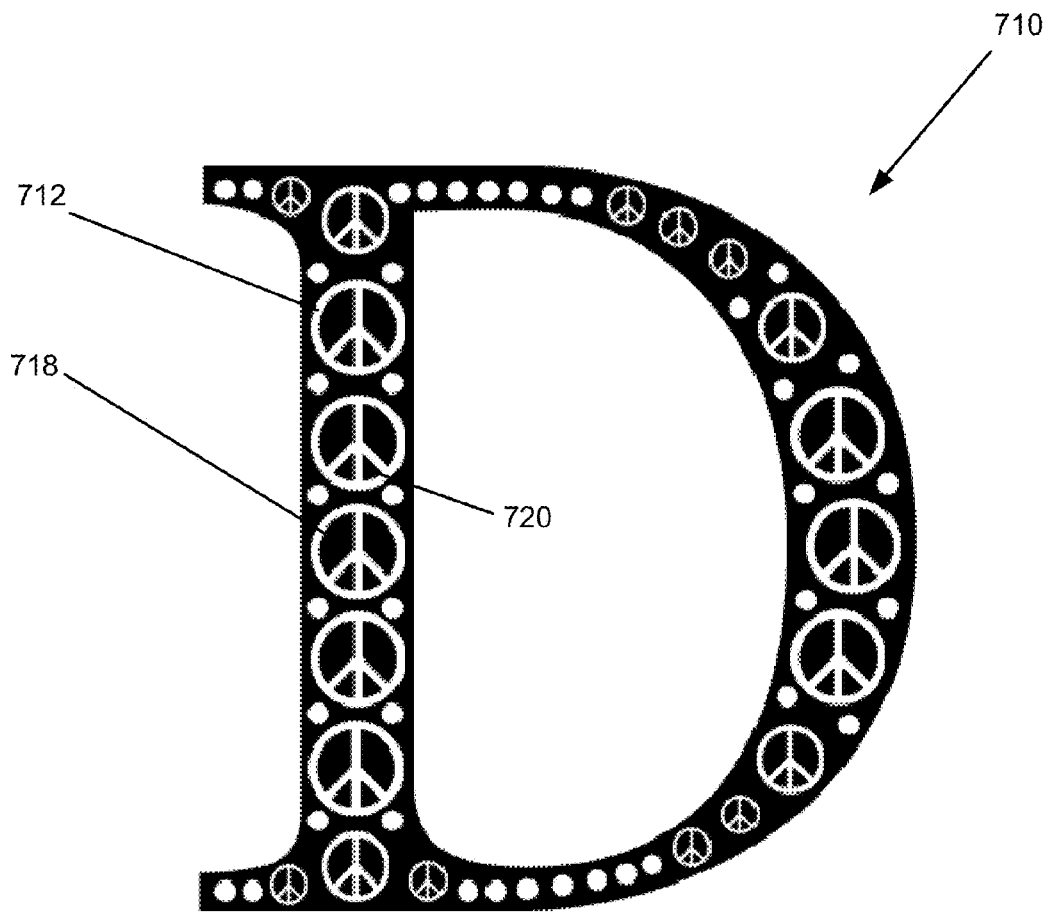
FIG. 7 is a view of a sample font glyph that was generated in accordance with the present invention. It is similar to FIG. 4, but highlights the use of an alternative perforation shape with dissimilarly-shaped nested perforations. The glyph contains peace symbol-shaped perforations with variously sized and oriented wedge-shaped perforations.

FIG. 7 is a view of a sample font glyph 710 that was generated in accordance with the present invention. The glyph 710 is similar to glyph 410 in FIG. 4, but includes an alternative shape for negative space perforations 812 and dissimilarly shaped nested perforations 818 and 820. The glyph contains peace symbol-shaped perforations 812 with various sized and oriented wedge-shaped perforations 818 and 820. Therefore, the peace symbol-shaped perforations 812 and the wedge-shaped perforations 818 and 820 are "geometrically dissimilar." This is in contrast to the perforations in other glyphs, such as shown in FIG. 5, where the heart-shaped negative space perforations 712 are "geometrically similar" to the heart-shaped nested perforations 518 located inside them.

Figure 8:
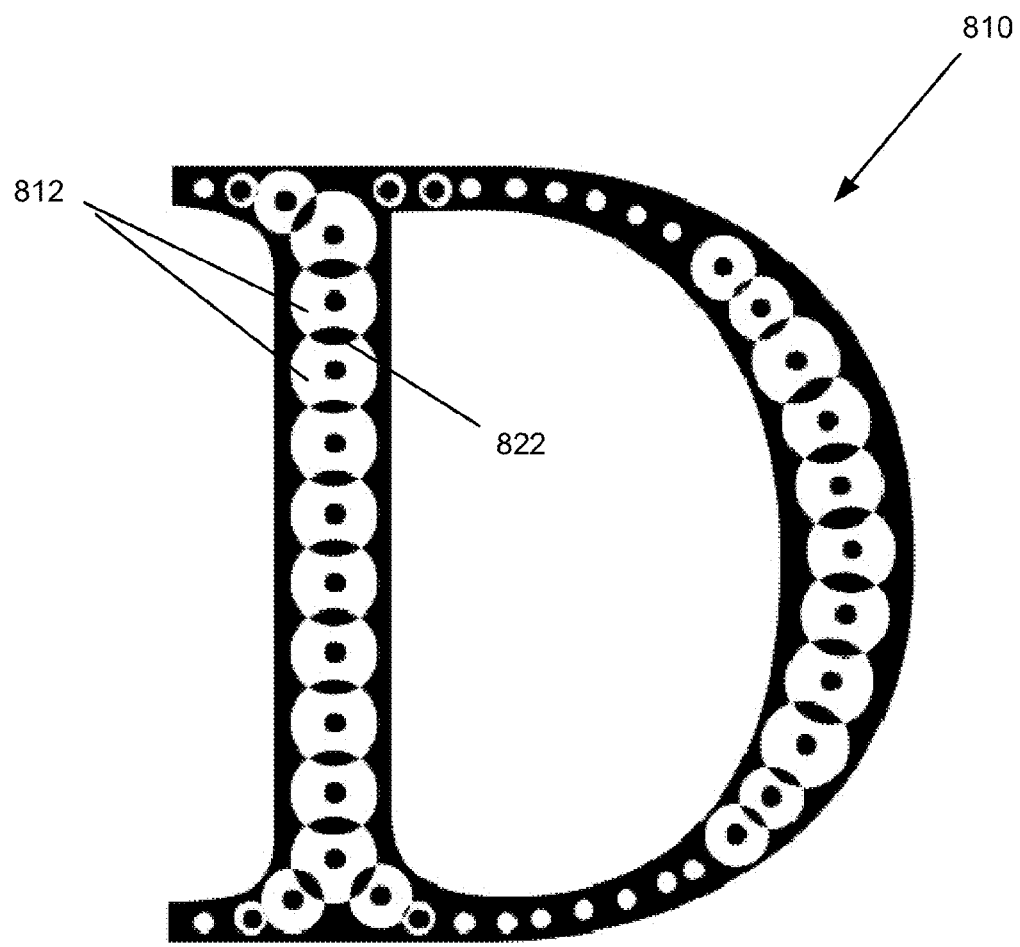
FIG. 8 is a view of a sample font glyph that was generated in accordance with the present invention. It is similar to FIG. 4, but highlights the use of overlapping perforations.

FIG. 8 is a view of a sample font glyph 810 that was generated in accordance with the present invention. It is similar to glyph 410 in FIG. 4, but includes overlapping perforations 912. The various-sized negative space perforations 912 are set to overlap in certain areas, creating overlap perforations 922 of positive space.

Figure 9:
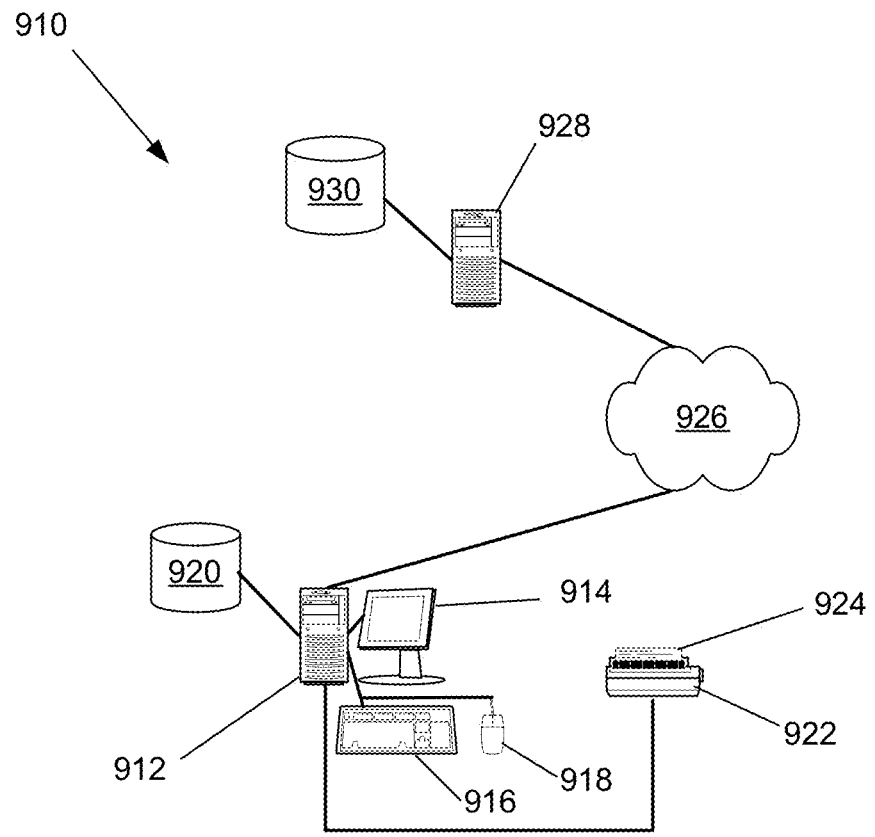
FIG. 9 is a diagram of hardware components used in connection with various embodiments of the present invention.

FIG. 9 is a diagram of hardware components used in connection with embodiments of the present invention. The configuration of hardware 910 shown in FIG. 9 is that of a client computer 912 and a server computer 928 connected through the Internet 926. Client computer 912 is connected to computer memory 920, monitor 914, keyboard 916, mouse 918, and printer 922, with paper 924 loaded therein. Server computer 928 is connected to memory 930. In other embodiments, the Internet 926 is instead a local area network. In still other embodiments, server computer 928 and memory 930 are not included. In embodiments without a server computer 928, client computer 912 is more appropriately referred to simply as a computer, as will be understood by those skilled in the art of computer networking. Memory 920 and/or memory 930 may be, for example, random access memory ("RAM"), read-only memory ("ROM"), flash memory, a flat-file database, a relational database, or combinations thereof. It will be understood by those skilled in the art of computers that the computers 912 and 928 each include at least one processor capable of executing instructions.

In operation, a person uses fonts generated according to the present invention in a normal manner. That is, a user would install fonts which were pre-generated or pre-modified to contain perforations as disclosed herein, or by installing software to generate such fonts on an as-needed basis. With reference to FIG. 9, a person operating computer 912 would proceed through an installation process, using mouse 918 and/or keyboard 916, and monitor 914 to store in the memory 920 of computer 912 pre-generated or pre-modified fonts, and/or software for generating such fonts on an as-needed basis. The person would then proceed to load or generate a document for printing, through a document editing program such as Microsoft Word™. In some embodiments, the person would select from a font-selection interface in the document editing software an option to use a font with perforations according to the present invention. In other embodiments, this step would not be necessary, and the computer 912 would be configured to send perforated versions of the font glyphs to the printer 922 during any printing operation. The printing compound is applied to printing medium (e.g. paper) 924, such when the printer 922 applies ink drops, or other print compound, thereto. In some embodiments, the perforated font may be viewed on the monitor 914 when viewing a document, regardless of whether the document is ultimately printed.

In accordance with certain embodiments of the present invention, to modify an existing font or generate a new font, a human designer can use font-editing software such as, but not limited to, Fontlab™ (http://www.fontlab.com) or Font-Forge™ (http://www.fontforge.sourceforge.net) to add perforations to font glyphs. In other embodiments, in lieu of a human designer generating perforations in font glyphs, a computer-implemented algorithm may be carried out to generate perforations in the font glyphs, as disclosed hereinbelow.

Figure 10:
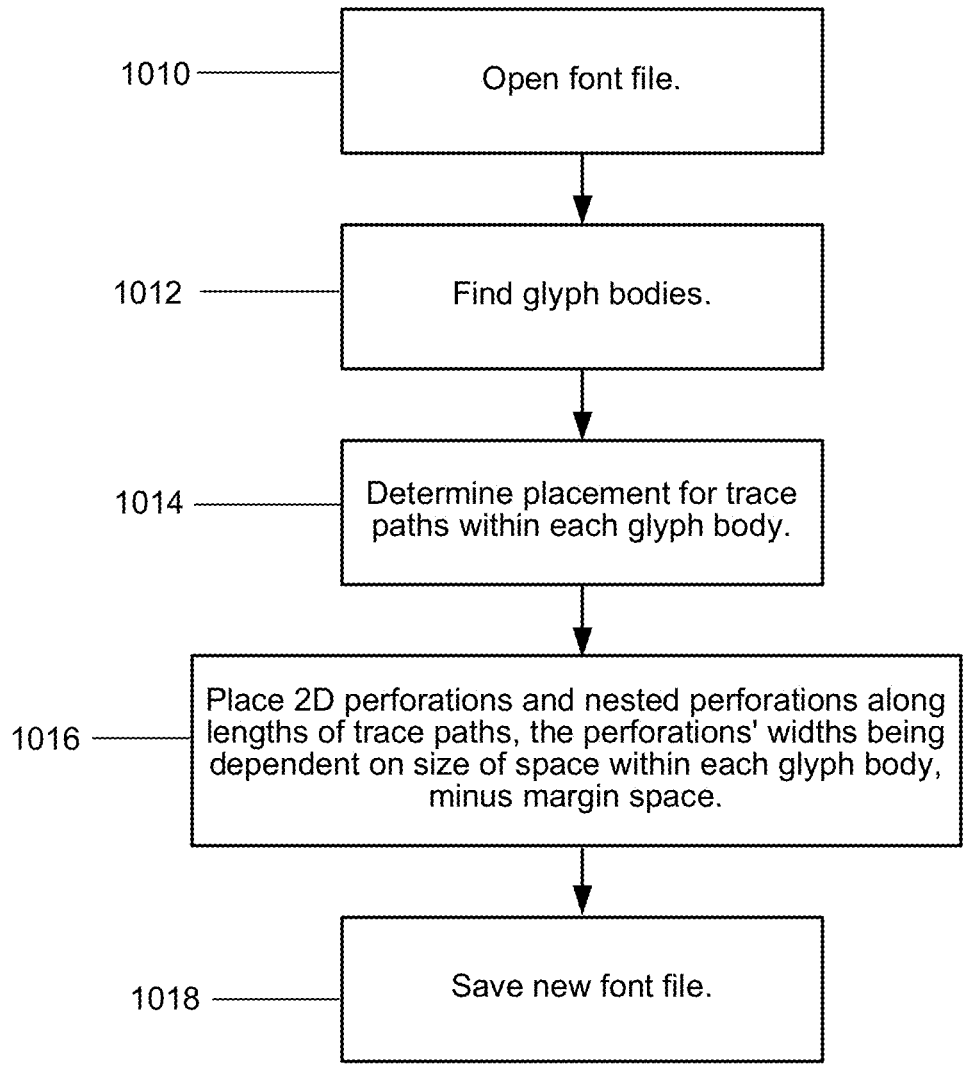
FIG. 10 is a flow chart illustrating steps in an exemplary algorithm for generating a print compound conserving font in accordance with the present invention.

FIG. 10 is a flow chart illustrating steps in an exemplary algorithm for generating a print compound conserving font in accordance with the present invention. In this sample stepwise procedure, the first step, labeled 1010 is to open a font file. With reference to FIG. 9, the font file is loaded by computer 912, from memory 920. In certain embodiments, the font file may have originated from the memory 930 of a server computer 928, and transmitted via TCP/IP or other data transmission protocol via an electronic communication network, such as the Internet 926.

The next step, labeled 1012 in FIG. 10, is to find the glyph bodies within the data from the font file. A computer 912 carrying out this step may use an edge detection algorithm to find the outline of each glyph, or the font data may specify the locations and contours of the outline of each glyph in the font.

With the glyph bodies found in the font data, the next step, labeled 1014 in FIG. 10, is to determine the placement for trace paths within each glyph body. Trace paths are straight or curving lines that will be placed within the boundaries of the outline of each glyph in the font.

Having determined the placement for trace paths for each glyph in the font, the next step, labeled 1016 in FIG. 10, is to place 2D negative-space perforations and nested (positive-space) perforations along the lengths of trace paths. In accordance with the present invention, all perforations exist within the outline of the corresponding glyph. As the contours of the outline of a given glyph are not uniform, the sizes of the perforations will vary to ensure that the perforations stay within the outline of the glyph. In certain embodiments, a numeric value for margin space may be set, in terms of an absolute distance or percentage of overall width, so as to prevent perforations from coming within a certain distance from the outer contours of a glyph's outline.

Finally, with the data for each glyph in the font modified with information regarding perforations, the font file is saved in the computer memory 920 (shown in FIG. 9). This final step is labeled 1018 in FIG. 10.

It will be understood by those skilled in the art that the procedure for algorithmically generating fonts in accordance with the invention may vary depending on the capabilities and preferred usage models of specific programming languages.

For example, an algorithmic implementation written in Python may differ from an algorithmic implementation written in MATLAB, Ruby, or Fortran, though the each specific algorithmic implementation is in accordance with the present invention.

Figure 11:
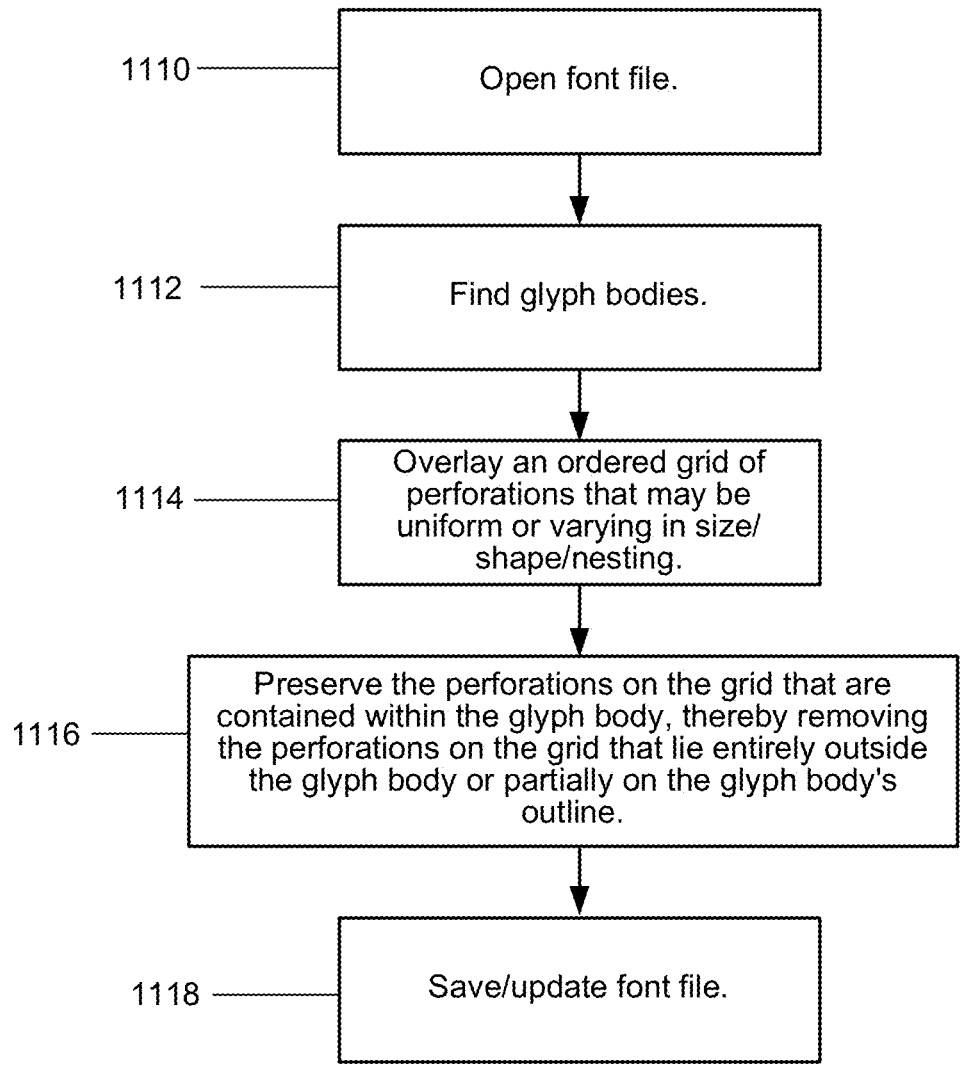
FIG. 11 is a flow chart illustrating steps in another exemplary algorithm for generating a print compound conserving font in accordance with the present invention.

FIG. 11 is a flow chart illustrating steps in another exemplary algorithm for generating a print compound conserving font in accordance with the present invention. The first step, labeled 1110 in FIG. 11, is to open the font file, loading it into memory 920 associated with computer 912 (see FIG. 9). As mentioned with respect to FIG. 10, the font file may have originated from the memory 920 of a server computer 928 which transmitted the font file through an electronic communication network, such as the Internet 926, to computer 912.

The next step, labeled 1112 in FIG. 11, is to find the glyph bodies within the data from the font file. Again, as mentioned with reference to the algorithm set forth with reference to FIG. 10, a computer 912 carrying out this step may use an edge detection algorithm to find the outline of each glyph, or the font data may specify the locations and contours of the outline of each glyph in the font.

Next, at step 1114 in FIG. 11, the computer 912 selects locations for negative-space perforations, and nested (positive-space) perforations, in each glyph found in the data from the font file. In this embodiment, an ordered virtual grid of perforations is virtually overlaid onto the body of each glyph found in the font data. The perforations may be uniform or vary in size, shape, and whether or not they are nested.

Having overlaid a virtual grid of perforations onto each glyph, the computer 912 then proceeds, at step 1116 in FIG. 11, to preserve only the perforations on the grid that are completely contained within each glyph body. That is, for each glyph, the computer removes perforations on the grid that lie entirely outside, or partially on, the glyph body's outline.

Finally, the computer 912 saves the modified font data, with the perforation information for each glyph, back to the font file. This step is indicated as 1118 in FIG. 11.

Figure 12:
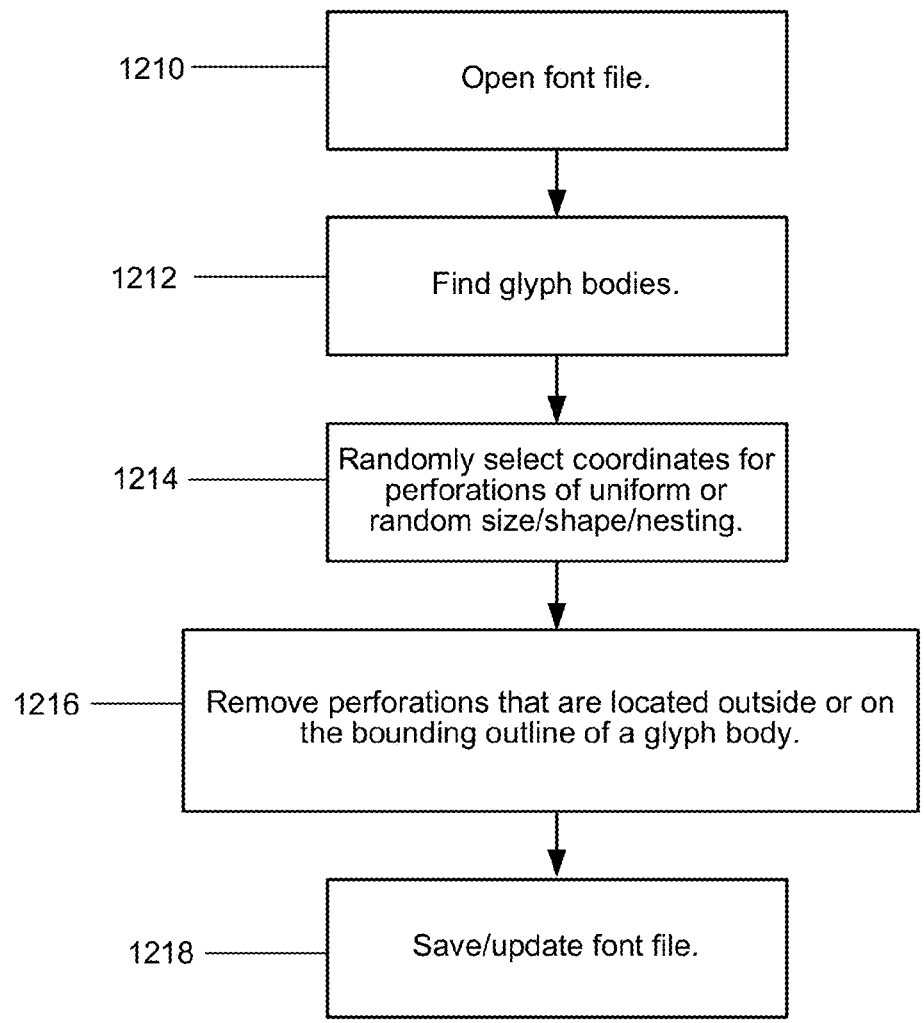
FIG. 12 is a flow chart illustrating steps in a third exemplary algorithm for generating a print compound conserving font in accordance with the present invention.

FIG. 12 is a flow chart illustrating steps in a third exemplary algorithm for generating a print compound conserving font in accordance with the present invention. As with the algorithms discussed above, the first step is to open the font file, loading it into memory 920 associated with the computer 912 (see FIG. 9). This step is labeled 1210 in FIG. 12.

The next step, 1212, is to find glyph bodies within the data from the font file. This step is carried out as discussed with reference to step 1112 in FIG. 11 and also step 1012 in FIG. 10. That is, the computer 912 may employ an edge detection algorithm to find the outline of each glyph, or the font data may specify the locations and contours of the outline of each glyph in the font.

The next step, 1214, the computer 912 randomly select coordinates for perforations in each glyph. The perforations may be uniform or random in size, shape, and whether or not they are nested. Next, at step 1216, the computer 912 preserves only the perforations that are completely contained within each glyph body. This is accomplished by removing perforations that are located outside or on the bounding outline of each glyph body. Finally, at step 1216, the computer 912 saves the modified font data, with the perforation information for each glyph, back to the font file.

Figure 13:
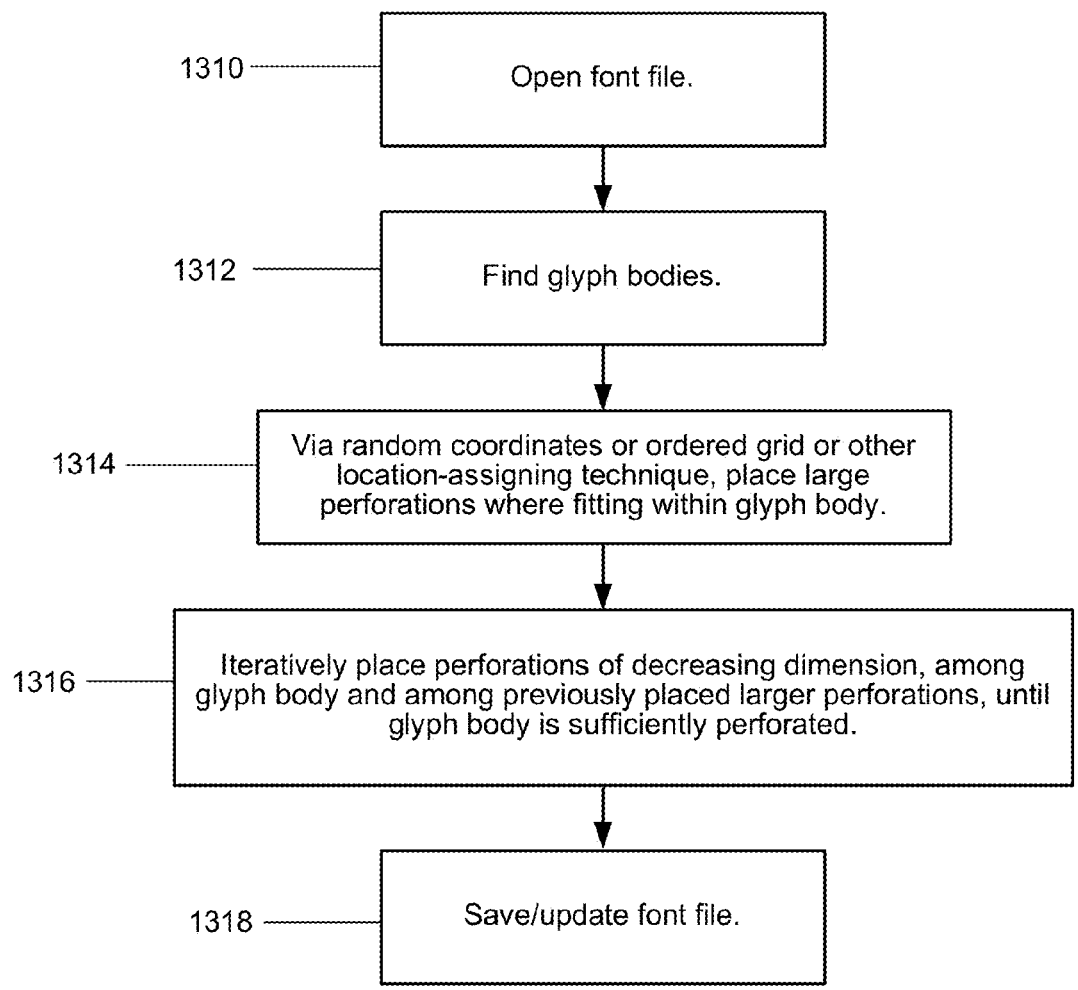
FIG. 13 is a flow chart illustrating steps in fourth exemplary algorithm for generating a print compound conserving font in accordance with the present invention.

FIG. 13 is a flow chart illustrating steps in a fourth exemplary algorithm for generating a print compound conserving font in accordance with the present invention. The first step, labeled 1310 in FIG. 13, is to open the font file, loading it into memory 920 associated with computer 912 (see FIG. 9).

The next step, labeled 1312, is to find the glyph bodies within the data from the font file. A computer 912 carrying out this step may use an edge detection algorithm to find the outline of each glyph, or the font data may specify the locations and contours of the outline of each glyph in the font.

Next, at step 1314, the computer 912, via random coordinates, or an ordered virtual grid, or other location-assigning technique, virtually places large perforations within each glyph body, ensuring that the perforations fit within the outline of each glyph. The perforations may be uniform or vary in size, shape, and whether or not they are nested.

At step 1316, the computer 912 iteratively places perforations of decreasing dimension, among each glyph body and among previously-placed larger perforations, until each glyph body is sufficiently perforated. In this context, "sufficiently perforated" means that (1) the glyph in question would result in at least a 38% savings in print compound over what the glyph would require had it not been modified, or (2) on average, printing with the font with glyphs as modified would result in at least a 38% reduction in print compound requirements, or (3) larger or additional perforations will not fit, within the glyph in question.

Finally, the computer 912 saves the modified font data, with the perforation information for each glyph, back to the font file. This step is labeled 1318 in FIG. 13.

Figure 14:
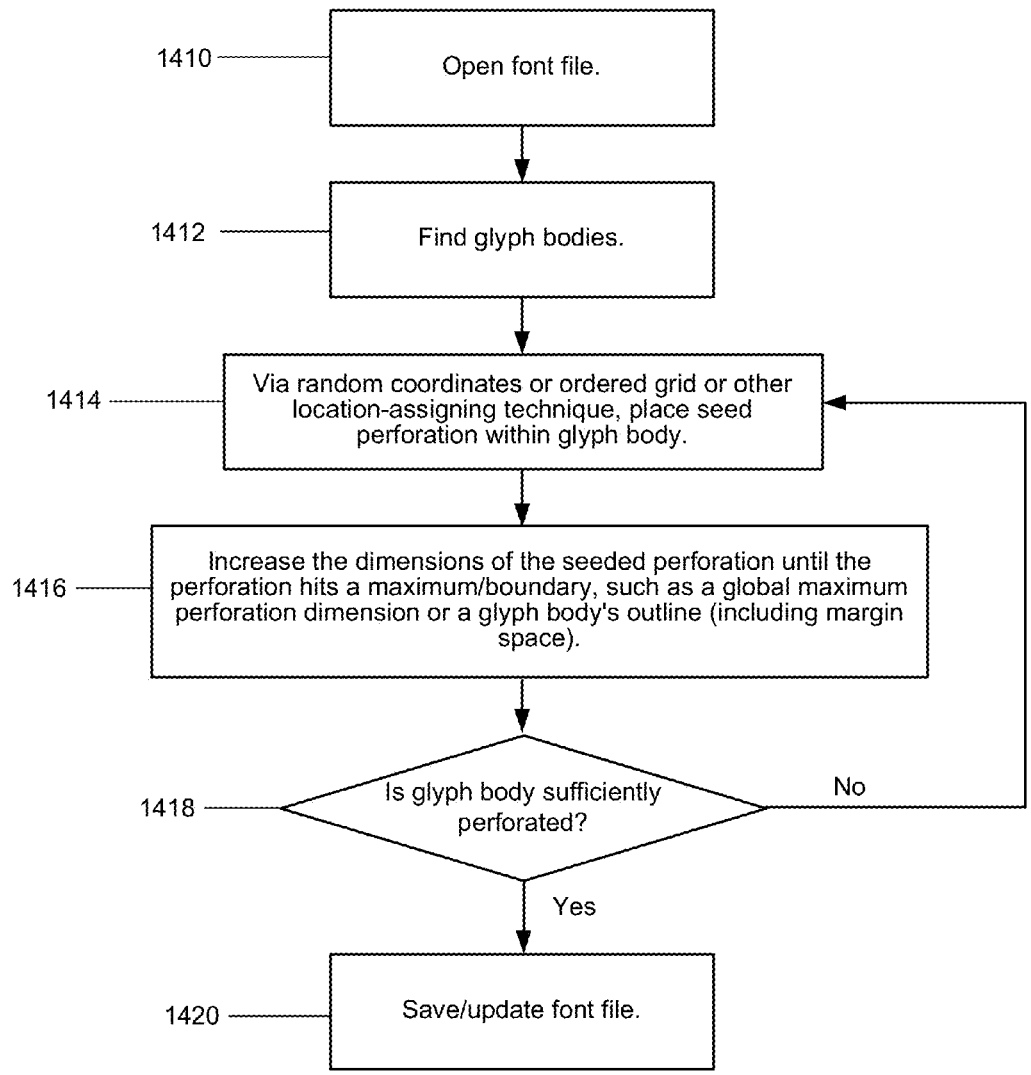
FIG. 14 is a flow chart illustrating steps in fifth exemplary algorithm for generating a print compound conserving font in accordance with the present invention.

FIG. 14 is a flow chart illustrating steps in a fifth exemplary algorithm for generating a print compound conserving font in accordance with the present invention. The first step, labeled 1410 in FIG. 14, is to open the font file, loading it into memory 920 associated with computer 912 (see FIG. 9).

The next step, labeled 1412, is to find the glyph bodies within the data from the font file. A computer 912 carrying out this step may use an edge detection algorithm to find the outline of each glyph, or the font data may specify the locations and contours of the outline of each glyph in the font. Next, at step 1414, the computer 912, via random coordinates, or an ordered virtual grid, or other location-assigning technique, virtually places a single "seed" perforation within each glyph body.

At step 1416, the computer 912 increases the dimensions of the seed perforation in each glyph, until each seed perforation encounters a boundary or other size limit. For example a boundary might be the outline of the particular glyph that the seed perforation is located inside. In other embodiments, a perforation is not allowed to come within a certain distance of the outline of the glyph, thereby defining a "margin" that a perforation may not infringe upon. In another embodiment, the size limit may be a numeric value representing an overall percentage of the glyph that the perforation may occupy, or a size specified in absolute units.

At step 1418, the computer determines whether each glyph body is sufficiently perforated. As discussed with reference to the algorithm in FIG. 13, "sufficiently perforated" means (1) the glyph in question would result in at least a 38% savings in print compound over what the glyph would require had it not been modified, or (2) on average, printing with the font with glyphs as modified would result in at least a 38% reduction in print compound requirements, or (3) larger or additional perforations will not fit within the glyph in question. If sufficient perforation does not exist, the computer loops back to step 1414. If sufficient perforation does exist, the computer proceeds to step 1420. At step 1420, the computer 912 saves the modified font data, with the perforation information for each glyph, back to the font file.

Figure 15:
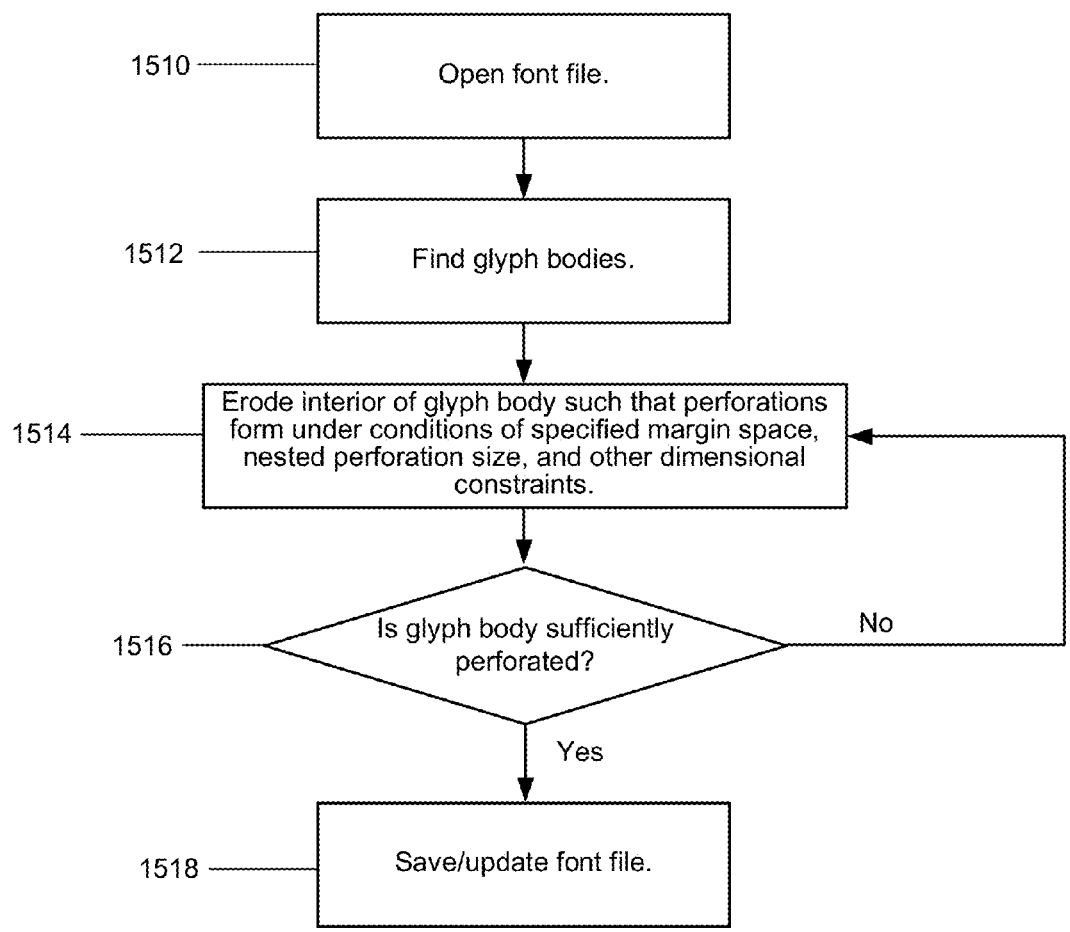
FIG. 15 is a flow chart illustrating steps in a sixth exemplary algorithm for generating a print compound conserving font in accordance with the present invention.

FIG. 15 is a flow chart illustrating steps in a sixth exemplary algorithm for generating a print compound conserving font in accordance with the present invention. The first step, labeled 1510 in FIG. 15, is to open the font file, loading it into memory 920 associated with computer 912 (see FIG. 9).

The next step, labeled 1512, is to find the glyph bodies within the data from the font file. A computer 912 carrying out this step may use an edge detection algorithm to find the outline of each glyph, or the font data may specify the locations and contours of the outline of each glyph in the font. Next, at step 1514, the computer 912, erodes the interior of each glyph body such that perforations form under user-specified, hard-coded, or randomly-generated criteria for margin space, nested perforation size, and/or other constraints.

At step 1516, the computer determines whether each glyph body is sufficiently perforated. As discussed with reference to the algorithm in FIGS. 13 and 14, "sufficiently perforated" means (1) the glyph in question would result in at least a 38% savings in print compound over what the glyph would require had it not been modified, or (2) on average, printing with the font with glyphs as modified would result in at least a 38% reduction in print compound requirements, or (3) larger or additional perforations will not fit within the glyph in question. If sufficient perforation does not exist, the computer loops back to step 1514, using the same or different constraints for further eroding the interior of each glyph with perforations. If sufficient perforation does exist, the computer proceeds to step 1518. At step 1518, the computer 912 saves the modified font data, with the perforation information for each glyph, back to the font file.

It should be understood that in other embodiments of the algorithms discussed above, the threshold for determining whether sufficient perforation exists may be higher or lower than a 38% savings in print compound.

Delivery Methods

Based on the foregoing discussion with reference to the figures, it should be understood that output from embodiments of the present invention includes, but is not limited to, digital compiled and non-compiled font data files in machine or human-readable format, as well as analogue typeset on permanent and/or impermanent media. The output may be one or more derivative works based on copyright/licensing arrangements of preexisting fonts, or may be one or more original works. In any event, the focus of the present invention is the generation of a print compound conserving font and delivery thereof, preferably via computers and electronic communication networks.

Manifestations

As should be clear from the foregoing discussion, methods according to the present invention can be incorporated into the development of a new font or used to modify an existing font. Methods according to the present invention are ideally suited for use on computers and digital networks, though their use can extend to include, for example, analogue mechanical printing machines.

A font or font glyph may be created in accordance with the present invention by manually or automatically using commercial, open source, or proprietary software or hardware implementations. Delivery of the resulting font or font glyph may occur locally, such as through storage in the memory 920 of a client computer, such as 912 in FIG. 9, or through generation, storage, and retrieval from the memory 930 of a server computer 928, which sends the font data to the client computer 912, through an electronic communications network, such as the Internet 926.

Methods for Both Generating and Delivering Output:
Computer-Executable Instructions As discussed above, in certain embodiments, a server computer 928 sends a font file to a client computer 912 for modification. Algorithms for generating perforations in font glyphs in accordance with the present invention are disclosed with reference to FIG. 10 and FIG. 11. In addition to the client computer 912 already having in its memory 920 computer-executable instructions for carrying out an algorithm for adding perforations to font glyphs, the server computer 928 may send such computer-executable instructions as well. In yet other embodiments, the server computer carries out the algorithm for generating the perforations in the font glyphs and sends the resulting font glyphs to the client computer 912 for printing. In yet other embodiments, initiation of the printing process on the client computer 912 involves sending the to-be-printed document to the server computer 930, which thereafter modifies the fonts in the document to contain perforations in accordance with the present invention. Afterwards, the document, with the modified font glyphs, is sent back to the client computer 912, which sends it modified document to the printer 922. Such an embodiment would be appropriate in a Software As A Service ("SAAS") model.

XML-Based Combination and Conversion

Extensible Markup Language (XML), a set of rules for encoding documents electronically, may be used as a human-readable format for combining multiple digital font files. As an example, a licensed font file residing on a client computer 912 may be converted from a native TrueType format to a 3CML-based, human-readable, text format known as TTX. The client computer 912 then acquires a corresponding file, which is an output from an embodiment of the present invention, to be used as an ° overlay to be combined with the licensed font file. The licensed font-plus-overlay combination is converted from TTX format to TrueType. The resulting font file, which is a technical combination of two formerly-independent font files, remains locally in the memory 920 of the client computer 912, or temporarily instantiated on a remote server 928 and transferred to the client computer 912.

Methods Solely for Generating Output:
Manual Font Editor

As mentioned above, a human designer may use a manual font editor such as FontForge™ or FontLab™ to create or edit a font using a method according to the present invention. The output of the font editor may be a digital compiled file that is machine readable in a format such as TrueType or OpenType.

Analogue Typography

Analogue type foundries, which may create fonts out of permanent materials, e.g. metal, can generate a glyphs for a font in accordance with the present invention by forging, molding, burning, or otherwise manipulating non-digital media.

Methods Solely for Delivering Output:
Digital Delivery

As should be understood from the forgoing description with reference to the figures, output from embodiments of the present invention, in electronic environments, including use on computers and across electronic communication networks such as the Internet, can be manifested or transferred via software and hardware, and all forms of electronic, magnetic, optical, and all other forms of storage, recall, and transmittal. Moreover, individual or multiple fonts or their components, along with licensing information, can be distributed simultaneously in bundled packs.

Analogue Delivery

To deliver the output from an embodiment of the present invention in analogue environments, as in environments not included in the preceding paragraph, one or more glyphs can be physically generated on and transferred to permanent and/or impermanent media, for example, from a typewriter's metal or rubber typebar to paper.

It is to be understood that all communication between computers and databases as disclosed herein is possible because they are connected together as part of the same computer or networked together via a wired or wireless network. It should also be understood that the memory discussed herein could be embodied in one or more flat files, relational databases, or other format, and that they could be stored in the memory of one computer or distributed across multiple computers.

The above-described processes, including portions thereof, can be performed by software, hardware, and combinations thereof. These processes and portions thereof can be performed by computers, computer-type devices, having at least one processor and a memory. The processes and portions thereof can also be embodied in data storage devices, for example, compact discs (CDs) or other storage media using, for example, magnetic, optical, or electronic storage.

The processes (methods) and systems, including components thereof, have been described with reference to specific hardware and software configurations. However, variations on the specific configurations are within the scope of the present invention. The processes (methods) have been described in example format, and persons of ordinary skill in the art will appreciate that specific steps and their order can be omitted and/or changed and result in working embodiments, without undue experimentation. The processes (methods) and systems have been described in a manner sufficient to enable persons of ordinary skill in the art to readily adapt other hardware and software as may be needed to reduce any of the embodiments to practice without undue experimentation.

While preferred embodiments of the disclosed subject matter have been described, so as to enable one of skill in the art to practice the present disclosed subject matter, the preceding description is intended to be exemplary only. It should not be used to limit the scope of the disclosed subject matter.

The invention claimed is:

1. A method for using at least one computer having a memory containing a font and a processor adapted to execute computer-executable instructions, to generate a print compound conserving font having at least one glyph comprising positive space defining an outline of the glyph against a background of negative space, the method comprising, for at least one glyph in the font in the memory of the computer:
(a) retrieving the glyph from the memory;
(b) adding at least one shape comprising negative space to the glyph, within the outline of the glyph;
(c) adding at least one shape comprising positive space within at least one shape comprising negative space, the at least one shape comprising positive space having a smaller size than the corresponding shape comprising negative space; and
(d) storing the glyph in the computer memory.

2. The method of claim 1, wherein a glyph comprises at least at least two shapes comprising negative space and wherein said at least two shapes comprising negative space are different in size.

3. The method of claim 1, wherein in step (c), the at least one shape comprising positive space is geometrically similar to the corresponding shape comprising negative space.

4. The method of claim 1, wherein in step (c), the at least one shape comprising positive space is geometrically dissimilar from the corresponding shape comprising negative space.

5. The method of claim 1, further comprising detecting the outline of the glyph using an edge-detection algorithm.

6. The method of claim 1, wherein steps (b) and (c) more specifically comprise:
generating straight or curved paths within the outline of the glyph; and
placing all shapes comprising negative space, and all shapes comprising positive space, along the paths.

7. The method of claim 1, wherein steps (b) and (c) more specifically comprise:
overlaying a grid of shapes comprising negative space and nested shapes comprising positive space onto the glyph; and
removing shapes on the grid that lie entirely outside, or partially on, the outline of the glyph.

8. The method of claim 1, wherein steps (b) and (c) more specifically comprise:
randomly selecting coordinates for shapes comprising negative space and nested shapes comprising positive space onto the glyph; and
removing shapes on the grid that lie entirely outside, or partially on, the outline of the glyph.

9. The method of claim 1, wherein steps (b) and (c) more specifically comprise:
placing shapes comprising negative space within the outline of the glyph at random coordinates or on a grid overlaid onto the glyph; and
iteratively placing shapes comprising negative space and/or shapes comprising positive space inside previously-placed shapes and/or at other locations within the glyph.

10. The method of claim 1, wherein step (b) more specifically comprises:
placing a shape comprising negative space within the outline of the glyph at random coordinates or on a grid overlaid onto the glyph; and
increasing the size of the shape until the shape meets a predetermined maximum size.

11. The method of claim 1, wherein step (b) more specifically comprises:
eroding the inside of the glyph with negative space within a specified distance of the outline of the glyph and within specified size constraints, thereby generating at least one shape comprising negative space within the glyph.

12. A method for printing a text in a font which conserves print compound, comprising:
transferring the text to a tangible media in a font comprising at least one glyph comprising:
positive space defining an outline of the glyph against a background of negative space;
at least one shape comprising negative space within the outline of the glyph; and
at least one shape comprising positive space within at least one shape comprising negative space within the glyph.

13. The method of claim 12, wherein at least one shape comprising negative space is a heart shape.

14. The method of claim 12, wherein at least one shape comprising negative space is a peace symbol.

15. The method of claim 12, wherein at least one shape comprising negative space is circular or elliptical.

16. The method of claim 12, wherein at least two shapes comprising positive space are within a single shape comprising negative space.

17. A system for generating a print compound conserving font having at least one glyph comprising positive space defining an outline of the glyph against a background of negative space, the system comprising:

a first computer having processor capable of executing computer-executable instructions, and a memory containing a font and computer-executable instructions for:

for at least one glyph in the font in the memory of the first computer:

(a) retrieving the glyph from the memory;

(b) adding at least one shape comprising negative space to the glyph, within the outline of the glyph;

(c) adding at least one shape comprising positive space within at least one shape comprising negative space, the at least one shape comprising positive space having a smaller size than the corresponding shape comprising negative space; and (d) storing the glyph in the memory of the first computer, whereby a print compound conserving font is generated and stored in the memory of the first computer.

18. The system of claim 17, further comprising:

a printer connected to the first computer and computer-executable instructions in the memory of the first computer for:

printing text in the print compound conserving font stored in the memory of the first computer.

19. The system of claim 17, further comprising:

a second computer having a memory and a processor capable of executing computer-executable instructions, the first computer and the second computer being in communication through an electronic communications network, the first memory of the first computer further comprising computer-executable instructions for:

transmitting the print compound preserving font stored in the memory of the first computer to the second computer, through the electronic communications network.

20. The system of claim 19, further comprising:

a printer connected to the second computer and computer-executable instructions in the memory of the second computer for:

printing text in the print compound conserving font transmitted from the first computer.

* * * * *